(12) United States Patent
Baur et al.

(10) Patent No.: US 10,568,349 B2
(45) Date of Patent: Feb. 25, 2020

(54) USE OF RESISTANT STARCHES IN COATING COMPOSITIONS

(71) Applicant: GRIFFITH LABORATORIES LIMITED, Scarborough (CA)

(72) Inventors: Joachim N. C. Baur, Newcastle (CA); Kenneth S. Darley, Whitby (CA); Luke P. Hazlett, Toronto (CA); John P. Kallo, Toronto (CA); Nilesh C. Patel, Toronto (CA)

( * ) Notice: Subject to any disclaimer, the term of this patent is extended or adjusted under 35 U.S.C. 154(b) by 0 days.

(21) Appl. No.: 14/897,994

(22) PCT Filed: Jun. 13, 2014

(86) PCT No.: PCT/CA2014/000499
§ 371 (c)(1),
(2) Date: Dec. 11, 2015

(87) PCT Pub. No.: WO2014/197976
PCT Pub. Date: Dec. 18, 2014

(65) Prior Publication Data
US 2016/0128369 A1 May 12, 2016

Related U.S. Application Data

(60) Provisional application No. 61/956,621, filed on Jun. 13, 2013.

(51) Int. Cl.
*A23L 5/10* (2016.01)
(52) U.S. Cl.
CPC .............. *A23L 5/15* (2016.08); *A23V 2002/00* (2013.01)

(58) Field of Classification Search
CPC ... A23L 5/15; A23L 7/10; A23L 7/157; A23L 29/212; A23L 33/21; A23L 29/219; A23L 3/3562
See application file for complete search history.

(56) References Cited

U.S. PATENT DOCUMENTS

| 5,855,946 A | 1/1999 | Seib et al. |
| 2004/0234663 A1 | 11/2004 | Motoi et al. |
| 2005/0031754 A1* | 2/2005 | Maningat ............... A21D 2/186 426/549 |
| 2006/0210695 A1 | 9/2006 | Ganjyal et al. |
| 2007/0092620 A1 | 4/2007 | Zimeri et al. |
| 2008/0283366 A1 | 11/2008 | Karpinskey et al. |
| 2011/0296560 A1 | 12/2011 | Frohberg et al. |

(Continued)

FOREIGN PATENT DOCUMENTS

| EP | 0512249 A1 | 11/1992 |
| JP | 2004329093 A | 11/2004 |

OTHER PUBLICATIONS

"Crumb" Definition from Free Dictionary.com. Retrieved Feb. 5, 2018. https://www.thefreedictionary.com/crumbs (Year: 2018).*

(Continued)

*Primary Examiner* — Katherine D Leblanc
(74) *Attorney, Agent, or Firm* — FisherBroyles, LLP; Edward R. Ergenzinger

(57) ABSTRACT

The present invention relates to compositions comprising RS4 resistant starch. The compositions of the present invention are for use in preparing textured crumb products via high pressure short time (HPST) extrusion for coating frozen and refrigerated food products.

29 Claims, 18 Drawing Sheets

(56) References Cited

U.S. PATENT DOCUMENTS

2012/0114770 A1 5/2012 Regina et al.
2012/0183652 A1 7/2012 Bashor et al.

OTHER PUBLICATIONS

Chapter 1: In: Leszek Moscick: "Extrusion-Cooking Techniques: Applications, Theory, and Sustainability.", 2011, Wiley-VCH Verlag GMBH&Co, Weinheim ISBN: 978-3-527-328 pp. 1-24.
www.pslc.ws/macrog/tg.htm (Feb. 2005).

* cited by examiner

Figure 1 — SEM W120525-025 (wheat base) with 20% wheat RS4 showing intact starch granules
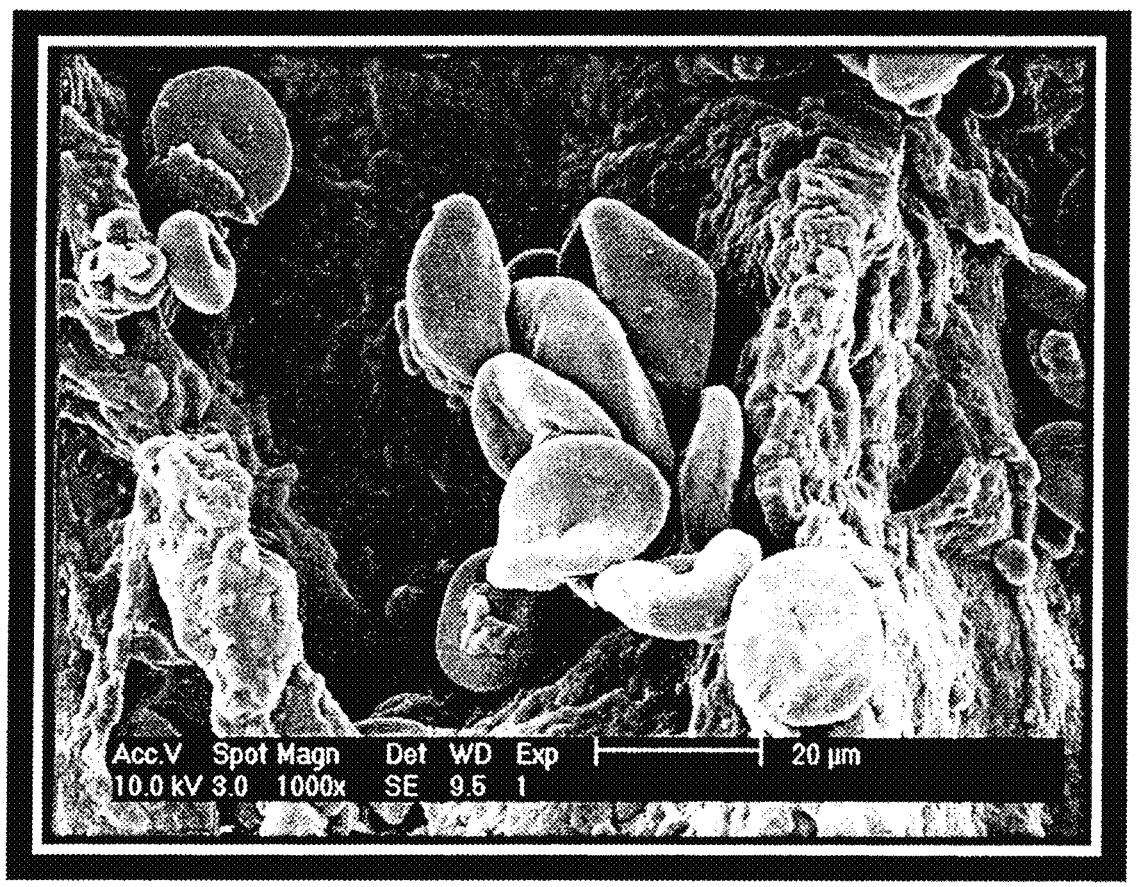

Figure 2 – SEM W120523-008 (wheat base) with 0% wheat RS4 showing no intact starch granules
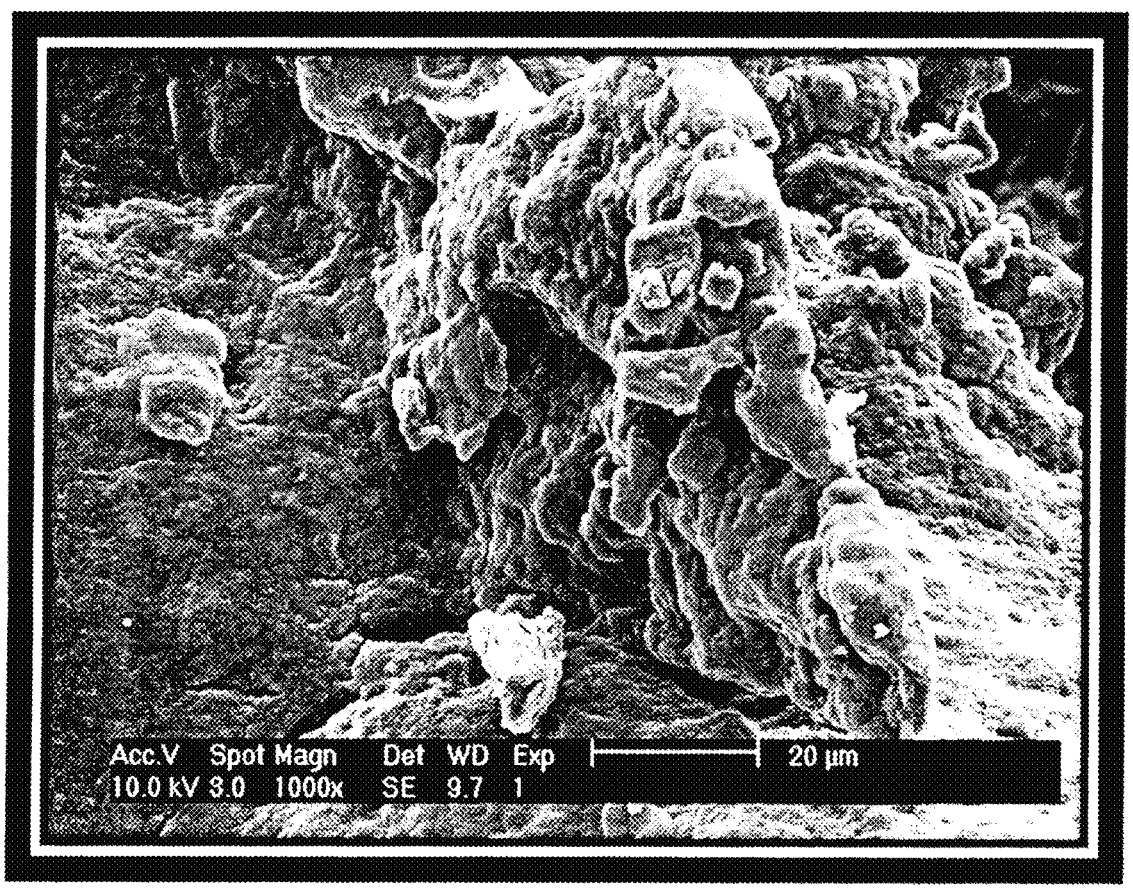

Figure 3 – SEM W120525-031 (wheat base) with 0% wheat RS4 showing no intact starch granules
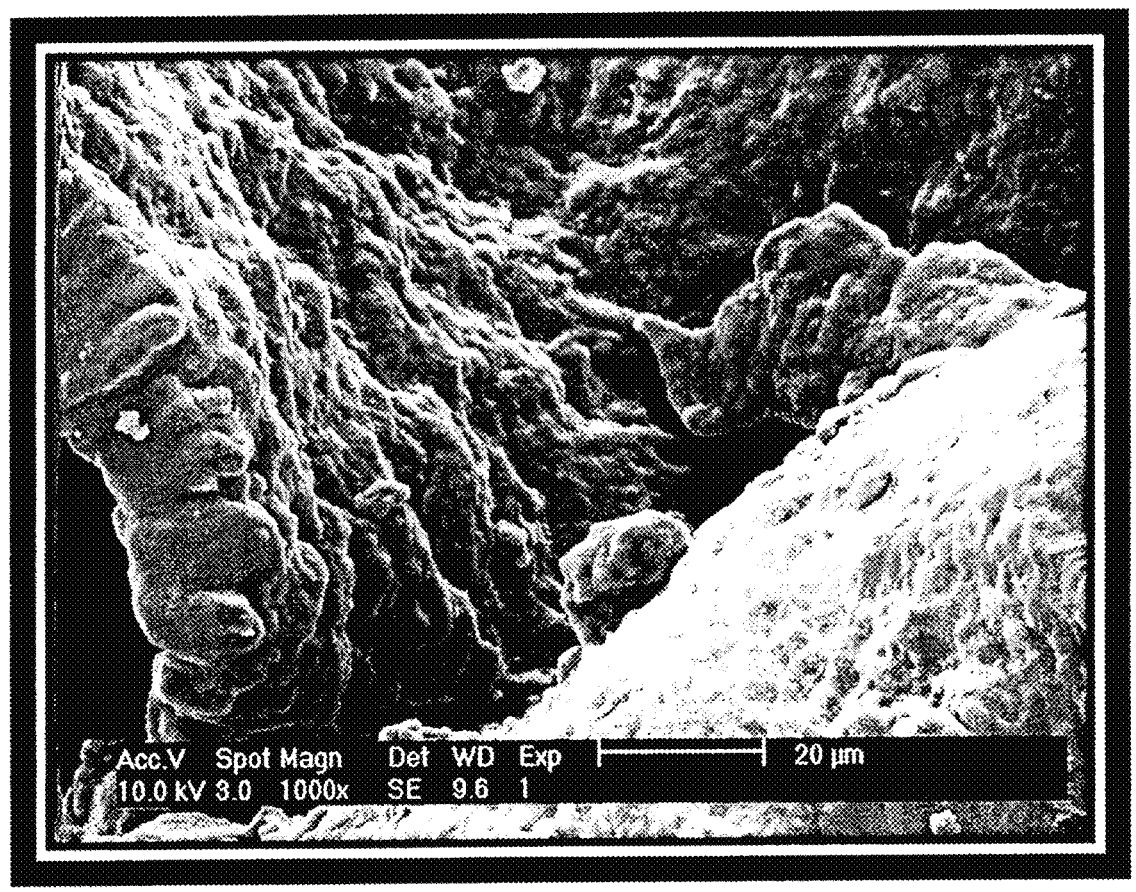

Figure 4 – SEM W120525-028 (corn base) with 15% wheat RS4 showing intact starch granules
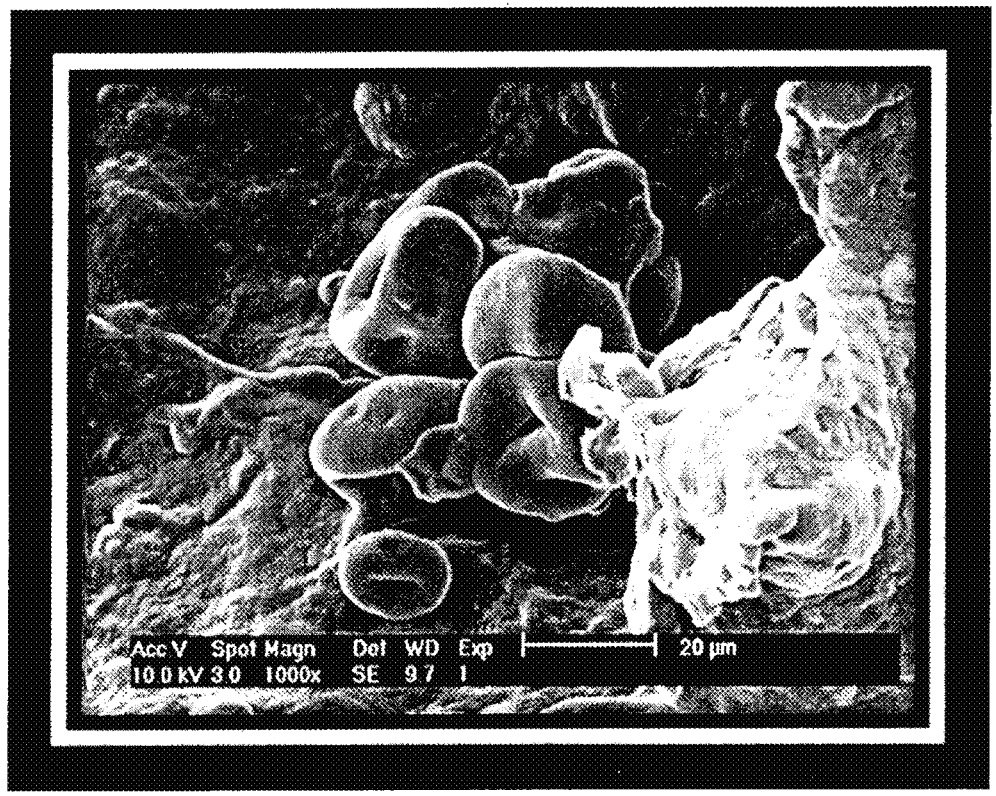

Figure 5 – SEM W120525-030 (rice base) with 15% wheat RS4 showing intact starch granules
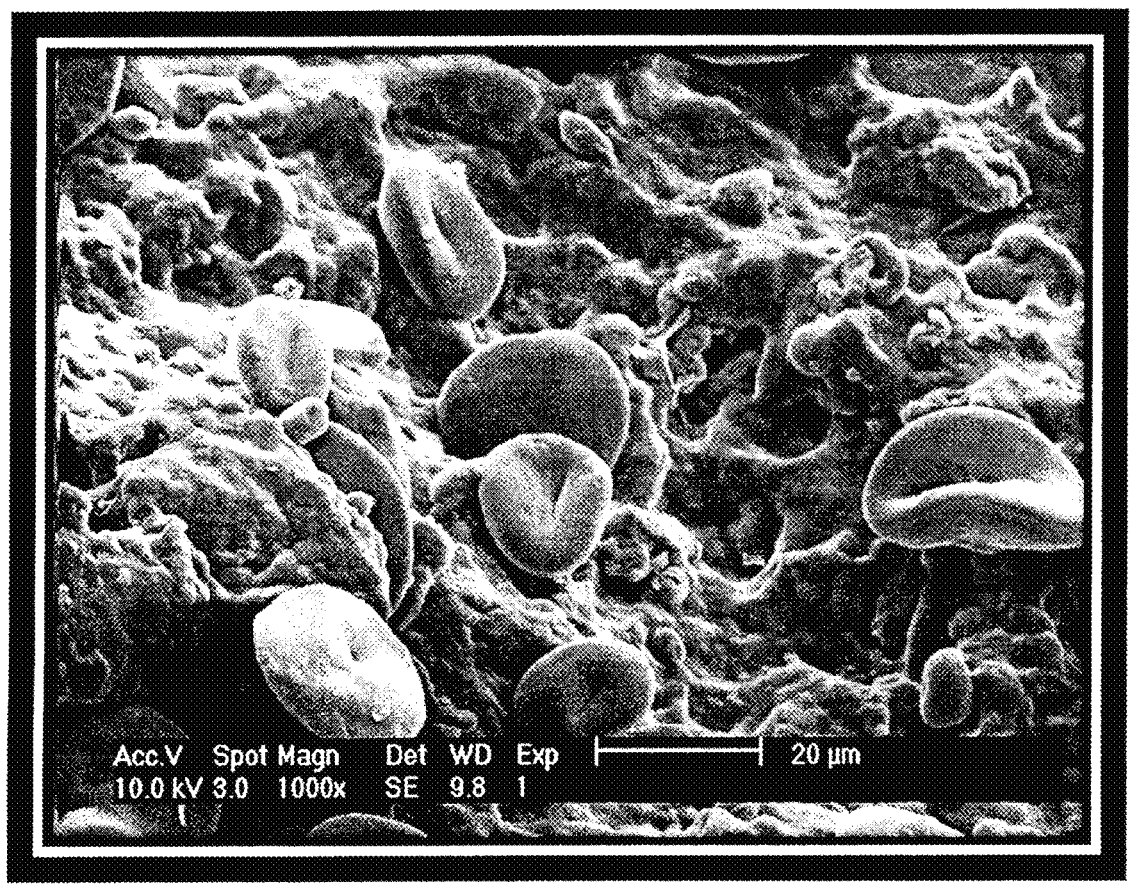

Figure 6 – SEM W130417-010 (rice base) with 10% wheat RS4 showing intact starch granules
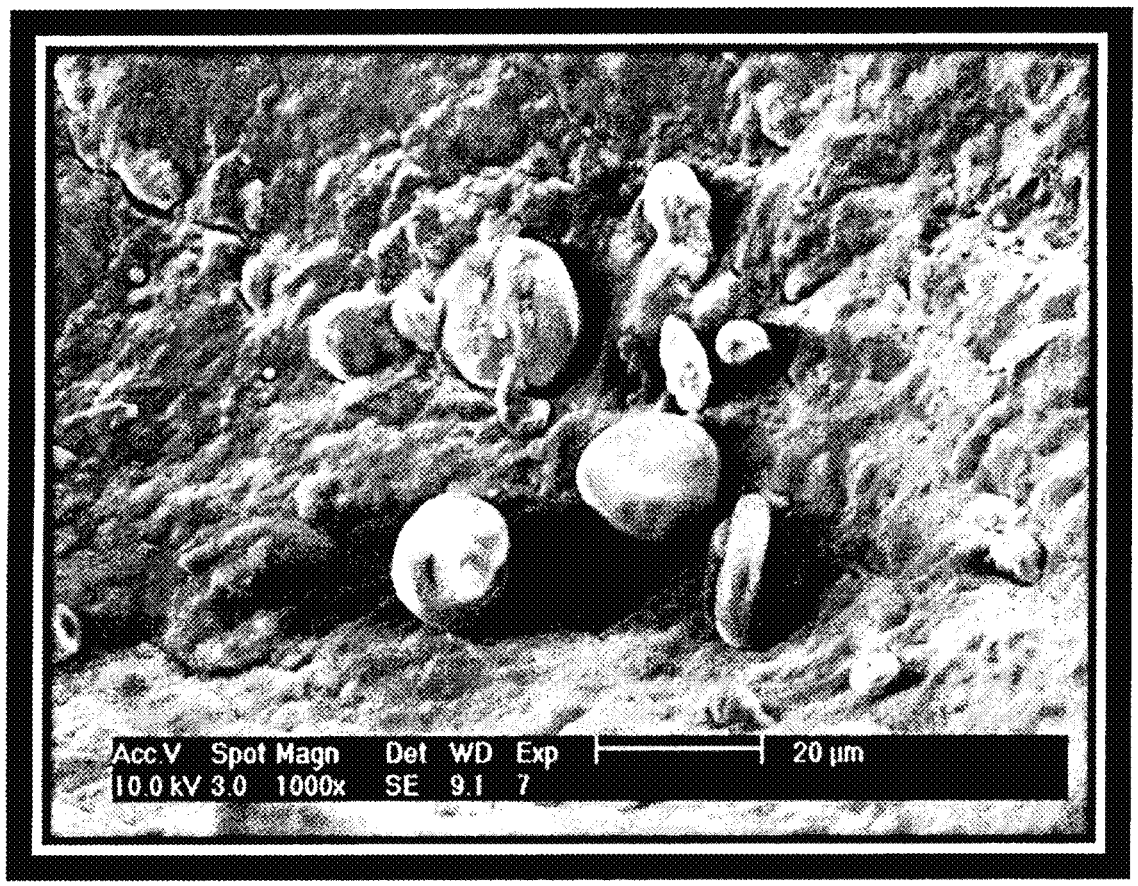

Figure 7 – SEM 130418-018 (rice base) with 10% Hylon VII® starch showing no intact starch granules
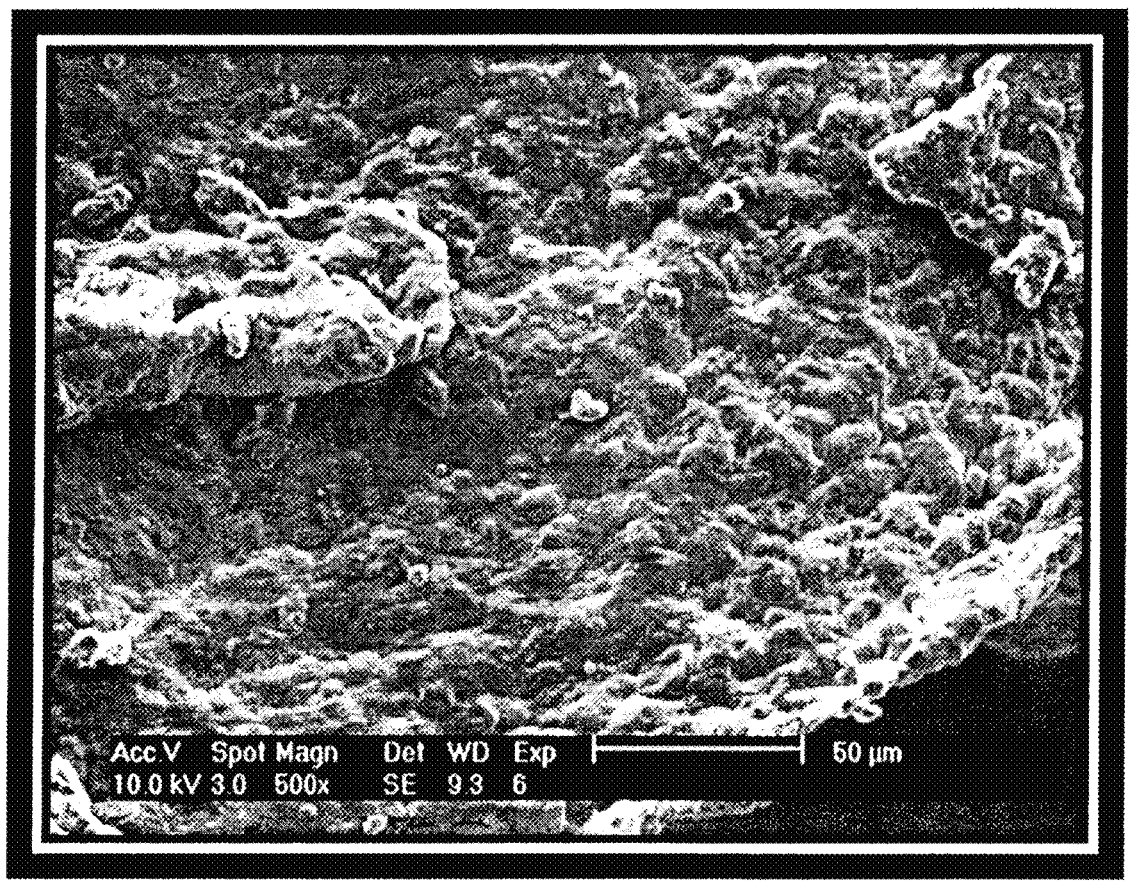

Figure 8 – SEM 130418-019 (rice base) with 10% Remy B7 starch showing no intact starch granules
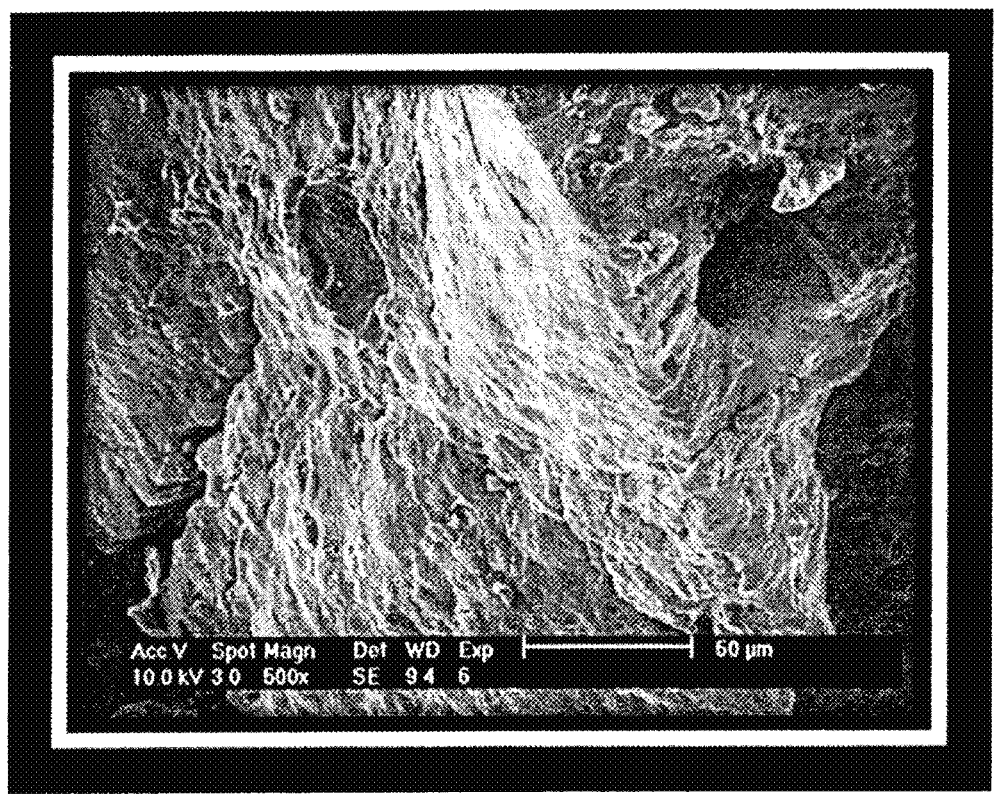

Figure 9 – SEM KB 8804 (wheat base) with 0% wheat RS4 showing embedded native starch granules within cooked dough matrix
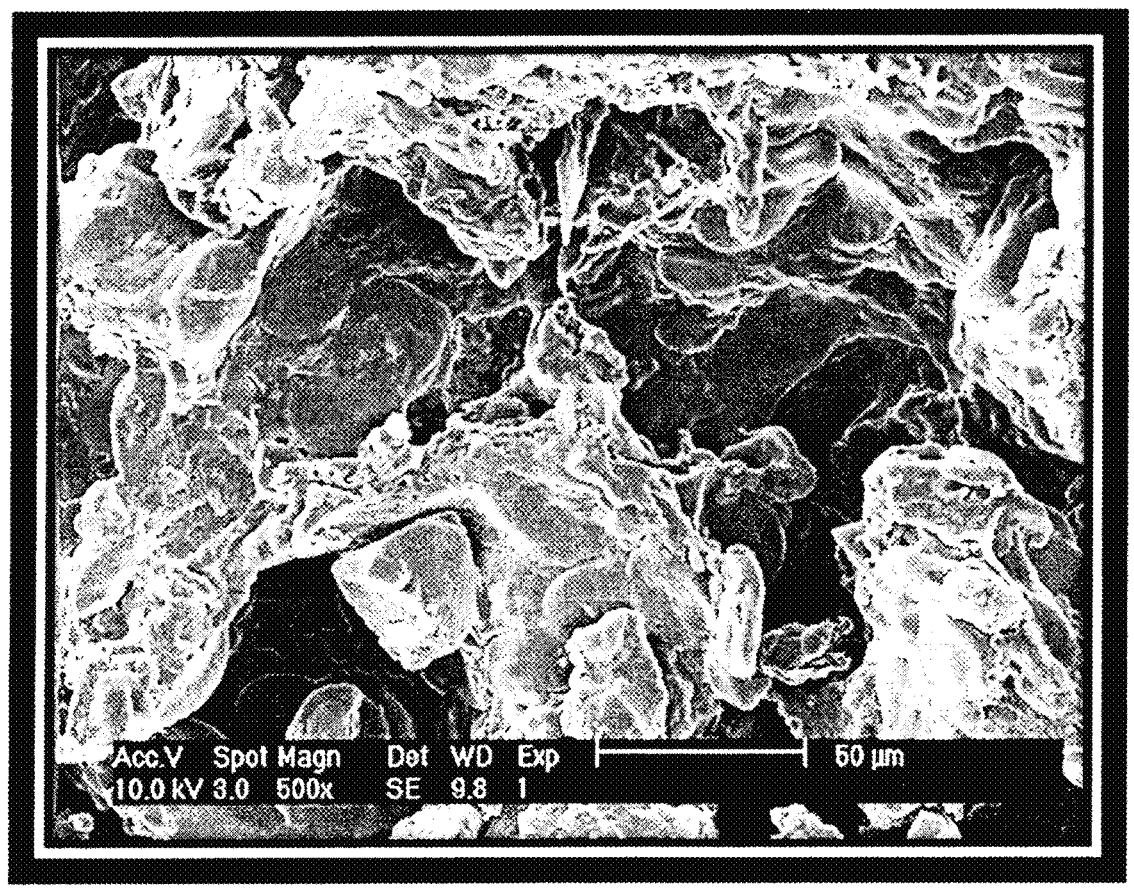

Figure 10 – RVA Cooked Viscosity Profile: HPST Crumbs with and without RS4 Wheat Starch
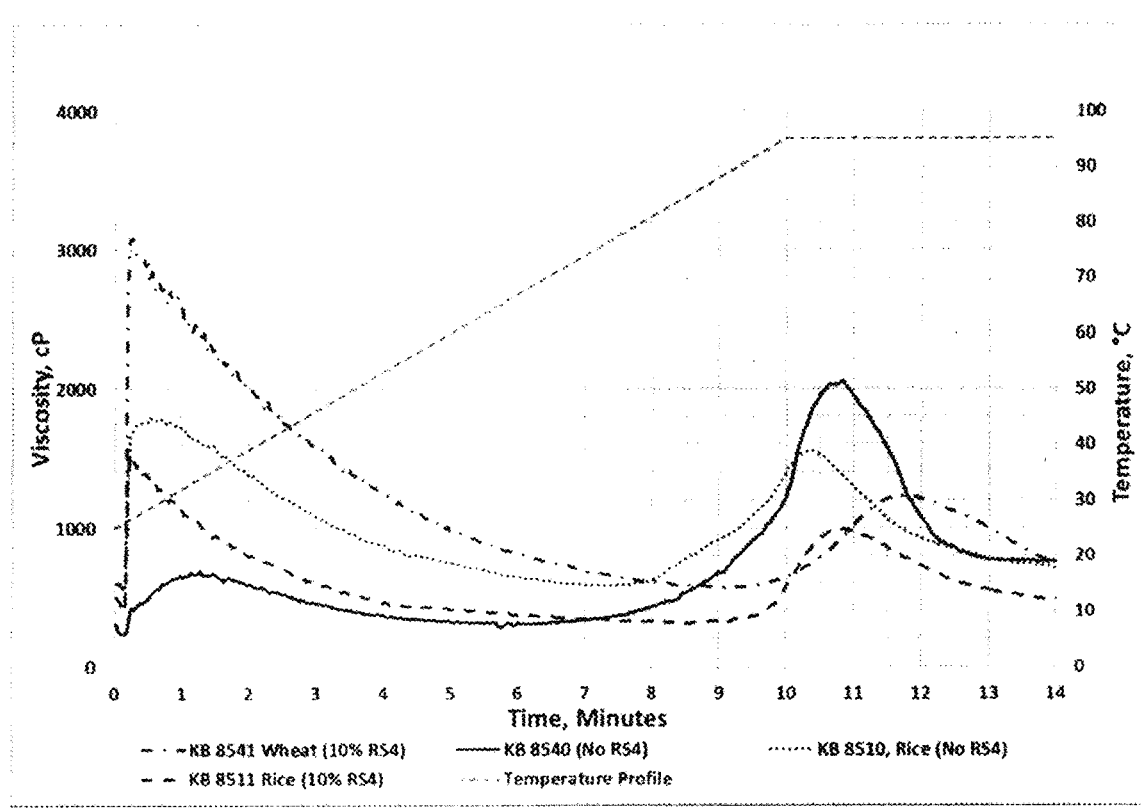

Figure 11 – RVA Cooked Viscosity Profile: RS4 Wheat Starch vs High Amylose Corn/Rice Starch in HPST Rice-based Crumb
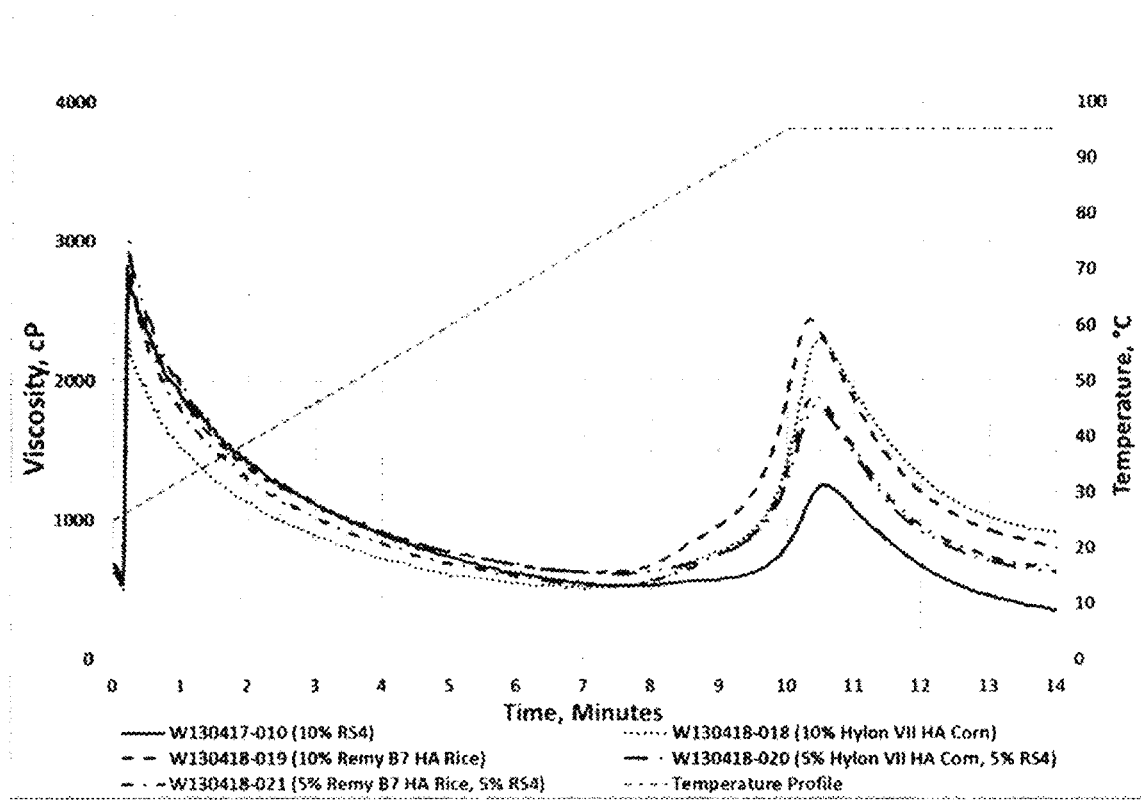

Figure 12 – RVA Cooked Viscosity Profile: RS4 Wheat Starch in CMKD Wheat-based Crumb
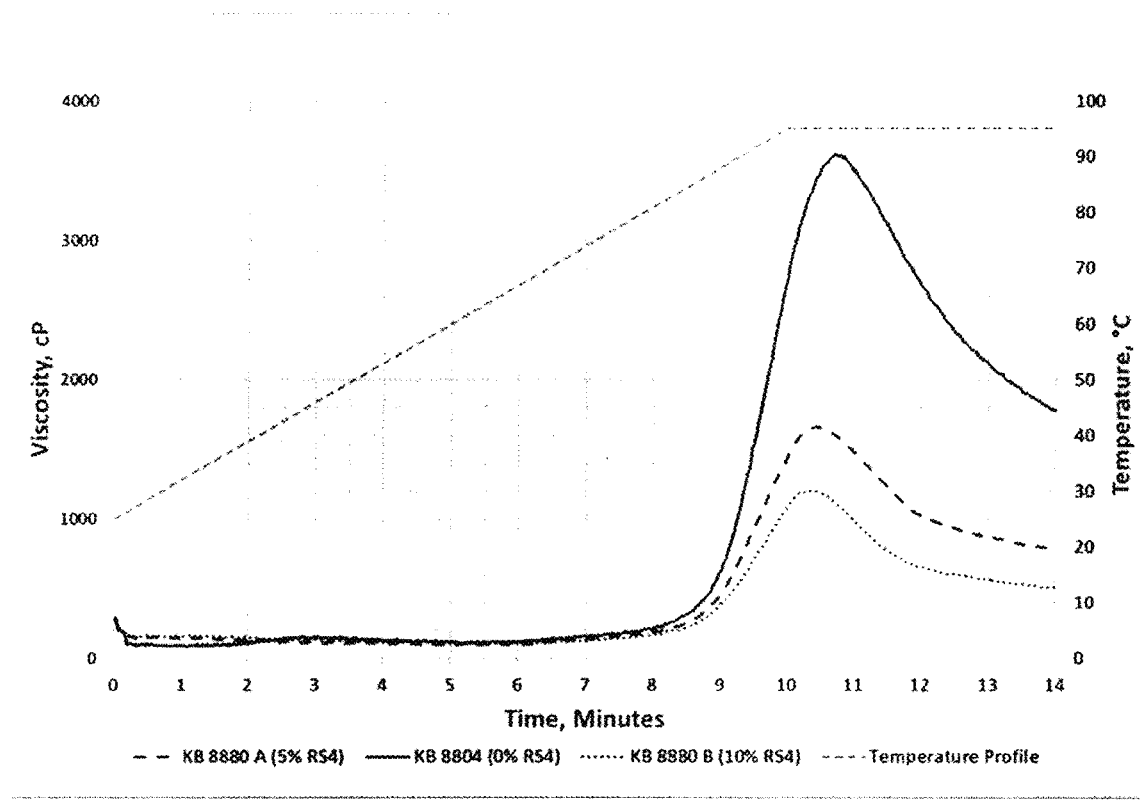

Figure 13 – KB 8804 (Wheat) CMKD Process – Control vs 6-cycle Freeze/Thaw
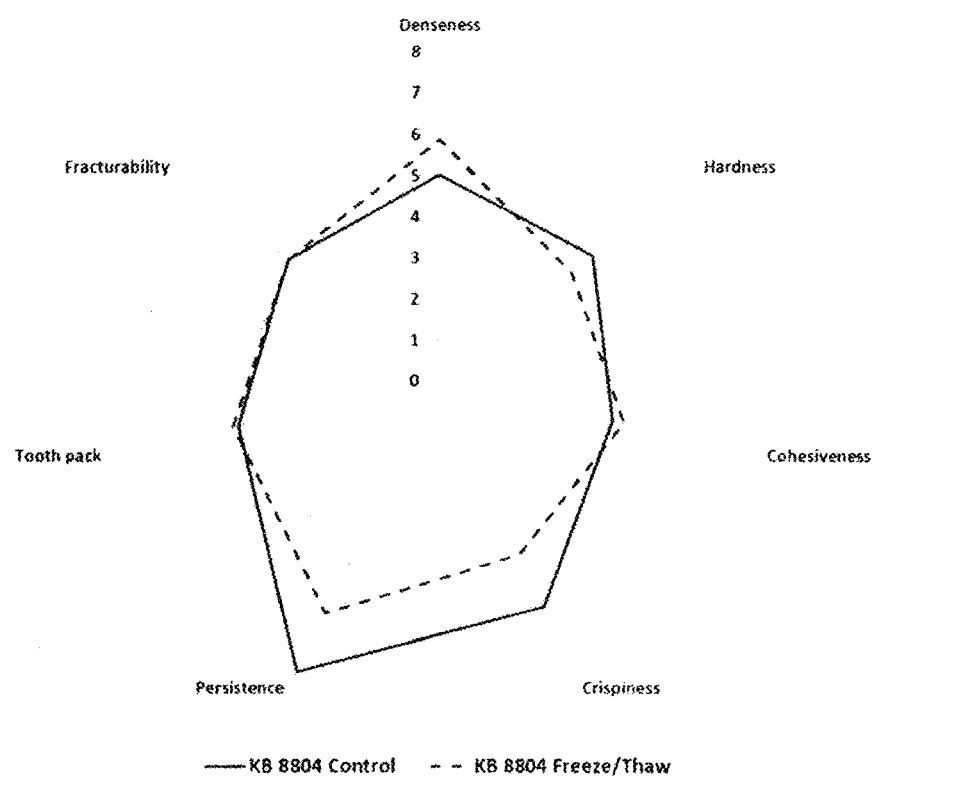

Figure 14 – W120525-022 (Wheat, 10% RS4, HPST process) Control vs 6-Cycle Freeze/Thaw
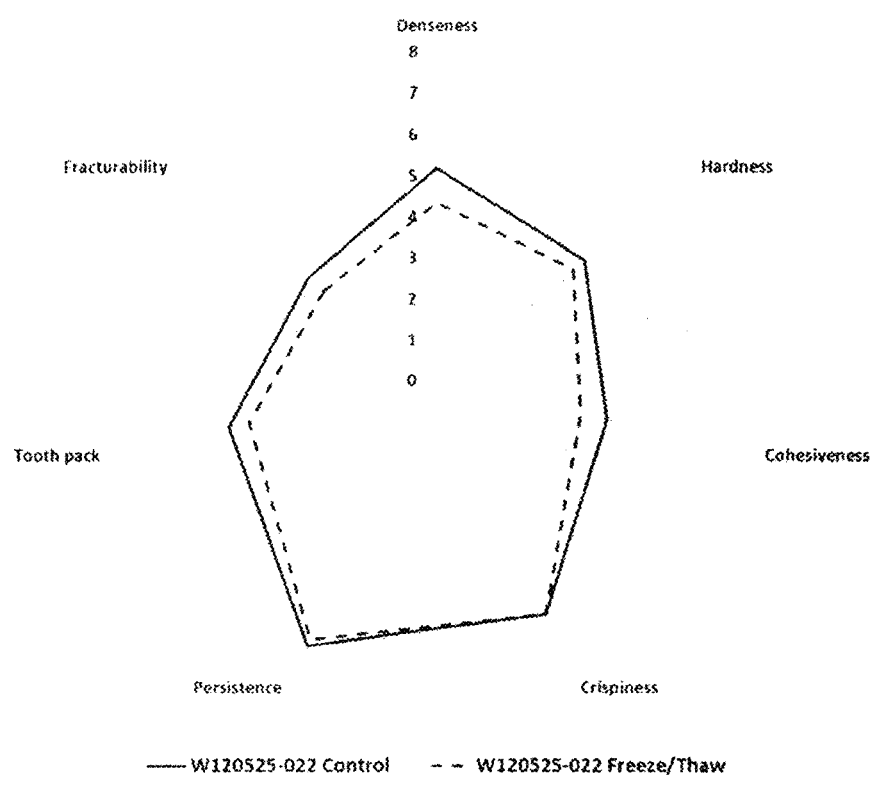

Figure 15 – W120525-028 (Corn, 15% RS4, HPST process) Control vs 6-Cycle Freeze/Thaw
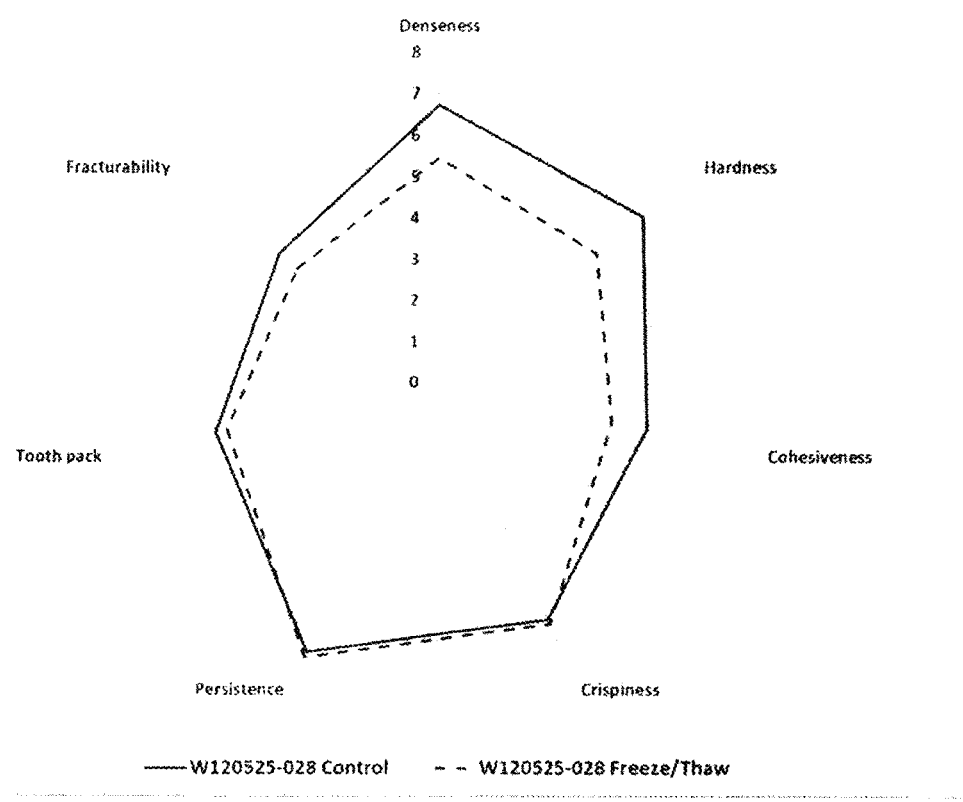

Figure 16 – W120525-029 (Rice, 15% RS4, HPST process) Control vs 6-Cycle Freeze/Thaw
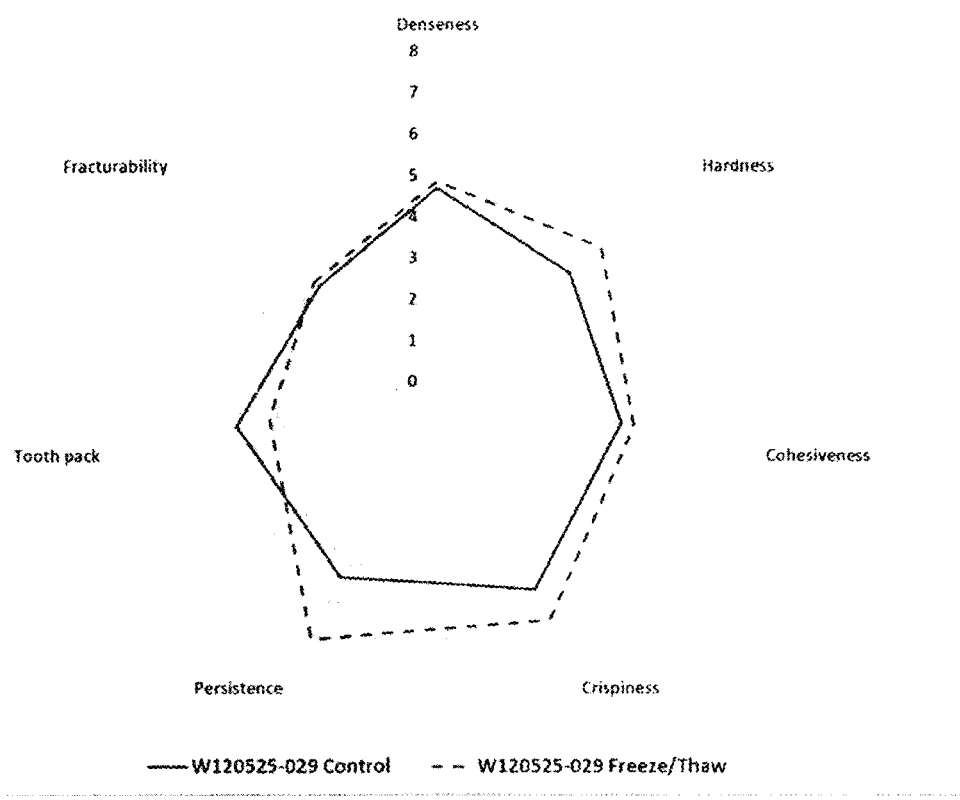

Figure 17 – Textural Comparison on Chicken Nuggets (Microwave Reheat after Freeze/Thaw abuse)
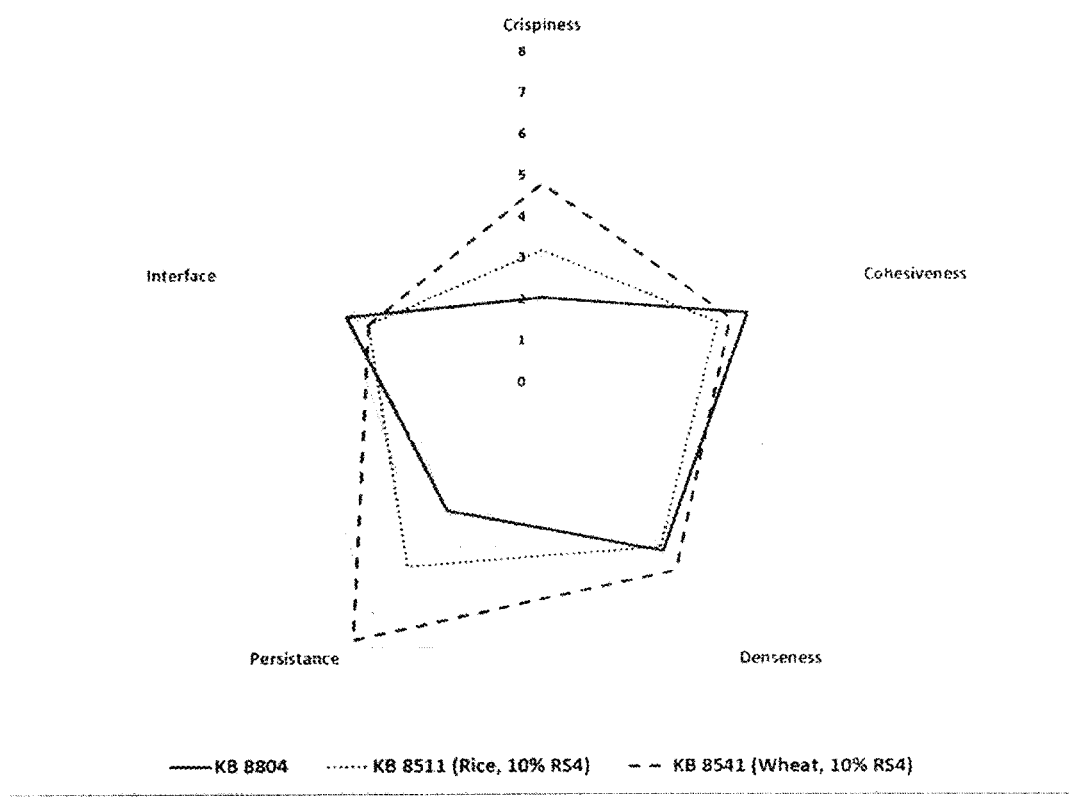

Figure 18: A single-screw food extruder for effecting HPST extrusion
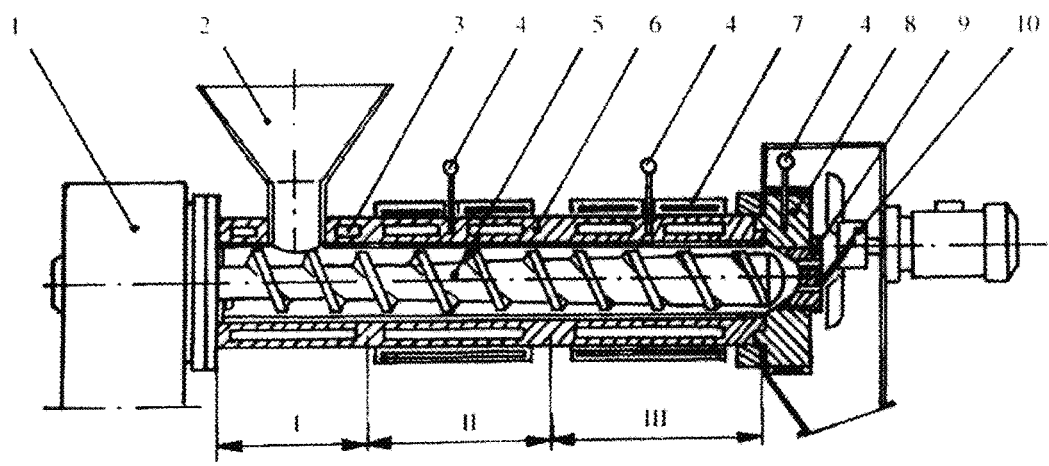

USE OF RESISTANT STARCHES IN COATING COMPOSITIONS

CROSS REFERENCE TO RELATED APPLICATIONS

This application is a 35 U.S.C. § 371 application of International PCT Patent Application No. PCT/CA2014/000499, filed on Jun. 13, 2014, which claims priority to U.S. Provisional Patent Application No. 61/956,621 filed Jun. 13, 2013; all of the contents of which are hereby incorporated by reference herein in their entireties.

REFERENCE TO RELATED APPLICATIONS

The present application claims priority under 35 USC 119(e) to U.S. Provisional Patent Application No. 61/956,621, filed on Jun. 13, 2013.

FIELD OF THE INVENTION

The present invention relates to frozen and refrigerated food products and coating compositions therefor.

BACKGROUND OF THE INVENTION

Many food products are provided in frozen or refrigerated ready-to-cook form and many such products have texturizers, such as bread crumbs, intended to provide appealing crispiness/crunchiness to the cooked products.

In many instances, their textural qualities are difficult to reach as a result of cost optimized yields; freeze-thaw abuse; frozen or refrigerated storage; food service holding practices, including warming cabinets, steam tables and heat lamps; and cooking methods, including humidity controlled ovens and microwave reheat.

RS4-type resistant starches are chemically-modified, highly-cross-linked starches, resistant to digestion by alpha-amylase and are widely used to provide dietary fibre to a wide variety of food products, such as bread, to provide a pre-biotic fibre source for gut health. These starches may be manufactured by procedures described in U.S. Pat. Nos. 5,855,946 and 6,299,903. Examples of RS4 resistant starches include Fibersym® (MGP), PenFibe™ RS (Penford Food Ingredients) and ActiStar® RT (Cargill) resistant starches.

SUMMARY OF THE INVENTION

It is an object of the present invention to overcome the deficiencies of the prior art frozen or refrigerated ready-to-cook food products.

Further and other objects of the present invention will become apparent to those skilled in the art from reading the following summary of the invention and the detailed description of the embodiments described and illustrated herein.

The present invention provides novel and inventive texturizing crumb products and other cereal grain-based products utilizing resistant starch as a portion of the starch component of the product, for coating food products.

In the present invention, RS4 resistant starch, one embodiment, from wheat, is used in conjunction with high pressure short time (HPST) extrusion technology to produce textured crumb materials for coating frozen or refrigerated food products. The present invention delivers superior textural qualities to assist in withstanding the problems associated with conventional frozen or refrigerated food coatings, particularly in microwave reconstituted foods. RS4 sources may also include, among others, potato and tapioca.

In accordance with an aspect of the present invention there is provided a composition for use in forming a textured crumb product, the composition comprising RS4 resistant starch.

In an embodiment of the present invention, the composition is a dry mix composition.

In an embodiment of the present invention, the RS4 resistant starch is present in amount of up to about 20 wt % of the composition.

In another embodiment of the present invention, the composition further comprises a cereal base.

In an embodiment of the present invention, the cereal base is present in an amount from about 65 to about 95 wt % of the composition.

In an embodiment of the present invention, the cereal base is wheat, rice or corn.

In another embodiment of the present invention, the composition further comprises a colour pre-mix.

In an embodiment of the present invention, the colour pre-mix is present in an amount from about 1 to about 10 wt % of the composition.

In an embodiment of the present invention, the colour pre-mix comprises an ingredient selected from the group consisting of a sugar, a salt, a colour, a cereal carrier and combinations thereof.

In an embodiment of the present invention, the colour is present in an amount of up to about 1.0 wt % of the composition.

In another embodiment of the present invention, the colour is present in an amount from about 0.03 to about 0.3 wt % of the composition.

In an embodiment of the present invention, the sugar is present in an amount of up to about 5 wt % of the composition.

In another embodiment of the present invention, the sugar is present in an amount from about 0.1 to about 5 wt % of the composition.

In another embodiment of the present invention, the composition further comprises a conditioning pre-mix.

In an embodiment of the present invention, the conditioning pre-mix is present in an amount of from about 4 to about 12 wt % of the composition.

In an embodiment of the present invention, the conditioning pre-mix comprises an ingredient selected from the group consisting of a salt, a conditioner, a cereal carrier and combinations thereof.

In an embodiment of the present invention, the salt is present in an amount of up to about 2 wt % of the composition.

In another embodiment of the present invention, the salt is present in an amount from about 0.5 to about 1.1 wt % of the composition.

In an embodiment of the present invention, the conditioner is present in an amount of up to about 10 wt % of the composition.

In another embodiment of the present invention, the conditioner is present in an amount from about 1 to 6 wt % of the composition.

In accordance with another aspect of the present invention, there is provided a textured crumb product formed from the composition as described above by high pressure short time (HPST) extrusion.

In an embodiment of the present invention, the textured crumb product as described above, when using differential scanning calorimetry, exhibits a glass transition temperature from about 50 to about 60° C. at a moisture level of about 44%.

In another embodiment of the present invention, the textured crumb product as described above, when examined under scanning electron microscopy with about 500 to about 1000 magnification, shows a predominantly gelled and amorphous matrix with intact resistant starch granules sitting on the matrix.

In accordance with another aspect of the present invention, there is provided a food product coated with the textured crumb product described above.

In accordance with another aspect of the present invention, there is provided a method of forming a textured crumb product comprising RS4 resistant starch, wherein the method comprises extruding the composition as described above using high pressure short time (HPST) extrusion.

Further advantages of the present invention will become apparent to those skilled in the art from reading the following detailed description of the embodiments described and illustrated herein.

BRIEF DESCRIPTION OF THE DRAWINGS

FIGS. 1 to 9 are scanning electron micrographs at a magnification of 500 to 1000× showing the presence or absence of intact starch granules in a variety of processed texturizing crumb products;

FIGS. 10 to 12 depict cooked viscosity curves of a variety of processed texturizing crumb products generated by a Rapid-Visco Analyzer (RVA);

FIGS. 13 to 17 summarize sensory results for textural attributes of coated food products comparing the performance of coating crumbs prepared according to the present invention against those produced through a continuous mixing and kneading no-time dough (CMKD) process; and FIG. 18 is a cross-sectional view of a single-screw food extruder for effecting HPST extrusion.

GENERAL DESCRIPTION OF THE INVENTION

The texturizing crumbs provided herein are comprised of a cereal base, such as wheat, rice or corn, and contain RS4 resistant starch up to, but not limited to, about 20 wt % of the formulation, in one embodiment, up to about 5 wt % of the formulation, in another embodiment, from about 5 to about 20 wt % of the formulation, in another embodiment, from about 5 to about 15 wt % of the formulation, in another embodiment, from about 5 to about 10% wt % of the formulation, in another embodiment, from about 10 to about 15 wt % of the formulation, and in another embodiment, from about 15 to about 20 wt % of the formulation. HPST extrusion is required in conjunction with the RS4 resistant starch to produce crumbs of the present invention with the desired textural properties and performance in the finished product application.

HPST extrusion technology is a process whereby a food material is forced to flow, under one or more varieties of conditions of mixing, heating and shear, through a die which is designed to form and/or puff/expand the ingredients (see Rossen, J. L. and Miller, R. C. Food extrusion. Food Technol., 1973. 27:46-53). HPST extrusion-cooking is carried out in a food extruder which generates large amounts of mechanical energy and shear. Food extruders are machines in which the main operative body is one screw or a pair of screws fitted in a barrel. During baro-thermal processing (typically pressures of up to about 20 MPa and a temperature of about 200° C.), the material is mixed compressed, melted and plasticized in the end part of the machine as shown in FIG. 18, wherein 1 is the engine, 2 is the feeder, 3 is the cooling jacket, 4 is the thermocouple, 5 is the screw, 6 is the barrel, 7 is the heating jacket, 8 is the head, 9 are the dies, 10 is the cutter, Section I is the transport section, Section II is the compression section, and Section III is the melting and plasticizing section [(see Extrusion-Cooking Techniques Applications, Theory and Sustainability Edited by Leszek Moscicki—Wiley-VCH (2011)—ISBN: 978-3-527-32888-8)]. At the exit of the extruder, the mixed ingredients are forced through openings in a perforated plate or die with a design specific to the food and are then cut to a specified size by a rotating knife (cutter).

Crumbs of the present invention have desirable textural characteristics such as crispiness, persistence of crisp and fracturability, which are retained even in coated food systems that have been subjected to a variety of stresses including freeze/thaw cycling, extended hold times and microwave reconstitution. In contrast, coating crumbs produced with a CMKD process do not retain their textural characteristics in stressed coating systems, losing crispness and becoming increasingly cohesive in these circumstances.

Using Differential Scanning calorimetry (DSC), RS4 containing crumbs of the present invention exhibit glass transition temperatures ($T_g$) between about 50 to about 60° C., even at a moisture level of about 44%, which is consistent with moisture levels present in the outer layers of coated food items subjected to stress such as freeze/thaw cycling or microwave reheat. The glass transition is associated with "glassy" textural attributes such as crispiness and fracturability. The magnitude of $T_g$ is reflected in the heat flow change or $\Delta C_p$ of the sample. CMKD processed crumbs or crumbs produced using the HPST extrusion process of this invention, but without RS4 content, do not exhibit glass transition states at this moisture level.

When examined by Scanning Electron Microscopy (SEM) with 500 to 1000× magnification, RS4 containing crumbs of the present invention show a predominantly gelled and amorphous matrix due to the high shear of HPST extrusion. Intact resistant starch granules are sitting upon this matrix (see FIGS. 1 and 4 to 6). Crumbs produced in a HPST extrusion process but without RS4 do not show intact starch granules (see FIGS. 2, 3, 7 and 8). CMKD processed crumbs exhibit a large amount of intact starch granules, although embedded within a dough matrix of proteins, lipids and hydrocolloids (see FIG. 9).

Cooked viscosity profile analysis using a Rapid-Visco Analyzer (RVA) identifies the degree to which starch granules, in this case within the crumb, are able to swell and rupture in a high moisture environment when heated to about 95° C. FIGS. 10 and 12 show differences in cooked viscosity profiles of HPST extruded and CMKD processed crumbs. RS4 crumbs of the present (see FIG. 10) show high initial cold viscosities prior to heating, associated with highly gelatinized starch. The subsequent and relative low peak is associated with residual pasting potential and influenced by the intact RS4 starch granules. CMKD processed crumbs (see FIG. 12) exhibit low cold viscosities due to the limited water holding capacity of the intact starch granules. During the heating phase, the starch granules of the CMKD processed crumbs take in water, swell, generate a significant viscosity peak and then rupture. The difference in water holding capacity on heating between HPST extruded RS4 crumbs and the CMKD processed crumbs has important effects on the cooked textural characteristics.

In a coated food product, long term freezer storage or freeze/thaw cycling has a water pumping effect, transferring moisture from substrate and inner coating layers to the outside layer. The HPST extruded RS4 containing crumbs of the present invention readily release this moisture without altering the state of the intact resistant starch granules, which themselves have poor water holding capacity. This results in improved textural properties upon cooking due to the ability of the crumbs of the present invention to undergo a glass transition under elevated moisture levels. Upon cooking CMKD processed crumbs, moisture is readily absorbed and held as the starch granules swell. The moisture is trapped within the crumb matrix and the glass transition is negated, resulting in poor textural properties exhibited as a soft and cohesive mass, so often associated with freezer storage abuse or microwave reconstitution.

EXAMPLES

Example 1

This Example illustrates the use of RS4 resistant wheat starch in texturizing crumbs through HPST extrusion using a Wenger TX85 model, in accordance with the present invention.

Texturizing crumbs were made by extruding the mixture through a Wenger TX85 pilot extruder. The twin-screw extruder was configured with an L/D ratio of 13.5 and double cut-flight elements within the last three zones. The extrudate was particulated and the crumb products generated under varying shear conditions as influenced by die configuration, dry feed rate, added moisture, location of water addition and extruder RPM. These conditions influenced motor load and head pressure as shown in Table 1.

TABLE 1

TX85 Operating Parameters to Produce RS4 Crumbs with Wheat Base

| Trial | Die Configuration | Dry Feed Rate kg/hr | Water wt % DDC/ Barrel | % Motor Load | Extruder RPM | Head Pressure kPa |
|---|---|---|---|---|---|---|
| W120523-008 | 2" spacer; Single Die 2 × 0.196" | 474 | 37/0 | 66 | 500 | 510 |
| W120525-025 | 3" spacer; Single Die 2 × 0.196" | 620 | 29/0 | 77 | 500 | 1090 |
| W120525-031 | Back 18 × 0.25" × 2; 1" spacer; Front 2 × 0.25" | 486 | 29/1 | 62 | 500 | 85 |
| W130416-008 | Back 24 × 0.171" × 2; 5/8" spacer; Front 2 × 0.25" | 516 | 32/0 | 69 | 490 | 3383 |

Table 2 outlines the levels of a RS4 wheat starch (Fibersym®) in wheat flour base formulations.

| Trial | Cereal Base % | Colour Premix % | Conditioning Premix % | Starch RS4 % |
|---|---|---|---|---|
| W120523-008 | Wheat @ 91 | Food Service(FS)@ 1 | 8 | 0 |
| W120525-025 | Wheat @ 66 | Retail(R)@ 6 | 8 | 20 |
| W120525-031 | Wheat @ 86 | R@6 | 8 | 0 |
| W130416-008 | Wheat @ 80 | R@6 | 4 | 10 |

Table 3 outlines the range of components within the premixes of Table 2.

| Premix | % Sugars | % Salt | % Colours | % Conditioners | % Cereal carriers |
|---|---|---|---|---|---|
| Colour | FS@0 R@70-80 | FS@50 R@9-18 | FS@5 R@0.8-5 | 0 | FS@45 R@7-10 |
| Conditioning | 0 | 0 | 0 | 28-65 | 35-72 |

Sugars include: dextrose, fructose and sucrose. Colours include: paprika and caramel. Conditioners include: oil, emulsifiers and nucleating agents. Cereal carriers include: wheat flour, rice flour and corn starch.

Table 4 outlines the effect of RS4 wheat starch (Fibersym®) on influencing crumb analytical characteristics.

| Trial | DSC Tg $\Delta C_p$ J/g · ° C. @ 44% Moisture | 1000X SEM Intact Starch |
|---|---|---|
| W120523-008 | Negligible | None |
| W120525-025 | 0.228 | Evident |
| W120525-031 | None | None |
| W130416-008 | 0.177 | Not Analyzed |

Trials W120523-008 and 120525-031 contained no RS4 wheat starch. Although they were run under significantly different shear conditions, neither exhibited glass transition nor showed evidence of intact starch granules as seen by SEM (see FIGS. 2 and 3). The wheat flour base of trials W120523-008 and 120525-031 underwent a complete melt and formed an amorphous structure on cooling.

With the addition of 10 and 20% RS4 wheat starch, in accordance with an aspect of the present invention, the SEM shows intact starch granules (see FIG. 1) and the glass transition becomes evident even at 44% moisture. These RS4 formulations exhibit a clear $T_g$ between about 50 to about 60° C. with $\Delta C_p$ increasing with the level of RS4.

W120525-031 and W130416-008 were both run with the same front, but different back die designs, the former with 60% greater open area compared to the latter. This resulted in W130416-008 experiencing significantly more shear, as indicated by the head pressure, and the subsequent crumb exhibiting glass transition. W120525-031 did not undergo glass transition.

Crumbs containing RS4 (W120525-025, W130416-008), in accordance with an aspect of the present invention, exhibited crispy and fracturable textures in a coated chicken nugget application where the product was subjected to freeze/thaw cycling and microwave reheat. The counterpart non-RS4 crumbs offered little or no textural contribution in the same stressed conditions and were described as soft and cohesive.

Example 2

This Example illustrates the use of RS4 wheat starch in texturizing crumbs made by HPST extrusion using a Wenger TX85 model extruder with alternate cereal bases; corn and rice, in accordance with the present invention.

TABLE 5

TX85 Operating Parameters to produce RS4 Crumbs with Rice or Corn Base

| Trial | Die Configuration | Dry Feed Rate kg/hr | Water wt % DDC/ Barrel | % Motor Load | Extruder RPM | Head Pressure kPa |
|---|---|---|---|---|---|---|
| W120525-028 | 3" spacer; Single Die 2 × 0.196" | 621 | 29/8 | 69 | 500 | 1125 |
| W120525-030 | 3" spacer; Single Die 2 × 0.196" | 612 | 35/0 | 81 | 400 | 679 |
| W130417-010 | Back 24 × 0.171" × 2; 5/8" spacer; Front 2 × 0.25" | 612 | 31/0 | 78 | 500 | 3947 |

Table 6 outlines the levels of a RS4 wheat starch (Fibersym®) in rice or corn base formulations, in accordance with the present invention.

| Trial | Cereal Base % | Colour Premix % | Conditioning Premix % | Starch RS4 % |
|---|---|---|---|---|
| W120525-028 | Corn @ 71 | 6 | 8 | 15 |
| W120525-030 | Rice @ 71 | 6 | 8 | 15 |
| W130417-010 | Rice @ 80 | 6 | 4 | 10 |

Table 7 outlines the range of components within the premixes of Table 6.

| Premix | % Sugars | % Salt | % Colours | % Conditioners | % Cereal carriers |
|---|---|---|---|---|---|
| Colour | 70-83 | 8-18 | 0.5-5 | 0 | 7-9 |
| Conditioning | 0 | 0 | 0 | 28-65 | 34-72 |

Sugars include: dextrose, fructose and sucrose. Colours include: paprika, caramel, annatto and turmeric. Conditioners include: oil, emulsifiers and nucleating agents. Cereal carriers include; corn flour, rice flour and corn starch.

Table 8 summarizes analytical data pertaining to the effect of RS4 wheat starch on influencing analytical characteristics of the crumb, in accordance with the present invention.

| Trial | DSC Tg ° C. @ 44% Moisture | 1000X SEM Intact Starch |
|---|---|---|
| W120525-028 | 51.1 | Evident |
| W120525-030 | 54.0 | Evident |
| W130417-010 | 57.7 | Evident |

All trials contained RS4 wheat starch and exhibited clear glass transitions and evidence of intact starch granules under varying shear conditions (see FIGS. 4 to 6). W120525-030 and W130417-010 rice-based formulations showed a significant difference in head pressure. Although the latter had the lower level of RS4 wheat starch and higher shear, the starch survives these conditions. The onset of the rice glass transition was delayed when compared to corn.

In finished product application on chicken nuggets subjected to freeze/thaw cycling and microwave reheat, rice-based crumbs with RS4 wheat starch, in accordance with an aspect of the present invention, exhibited light crispy textures with little cohesion, while the corn-base with RS4 wheat starch, also in accordance with an aspect of the present invention, provided some crisp/crunch with moderate cohesive character. Rice and corn-based controls without RS4 provided little or no texture in the abused conditions.

Example 3

This Example illustrates the use of a RS4 wheat starch in texturizing crumbs made by HPST extrusion using a commercial scale Wenger TX144 model extruder, in accordance with the present invention.

Crumbs were made by extruding the mixture through a Wenger TX144 extruder. The twin-screw, 3 head extruder was configured with an L/D ratio of 13.5 and double cut-flight elements within the last two zones. The extrudate was particulated and the crumb products generated under varying shear conditions as influenced by added moisture and extruder RPM. These conditions influenced motor load and head pressure as seen in Table 5. Operating parameters for a commercial extrusion process were scaled-up from the Wenger TX85 pilot trials and did not require as wide a range of study.

TABLE 9

TX144 Operating Parameters: Wheat/Rice-based Crumbs with and without RS4 wheat starch.

| Trial | Die Configuration | Dry Feed Rate kg/hr | Water wt % DDC/ Barrel | Extruder RPM | % Motor Load | Head Pressure kPa |
|---|---|---|---|---|---|---|
| KB 8540 | Face Die, 8 × 3/16" | 1500 | 27/3 | 400 | 75 | 4000 |
| KB 8541 | Face Die, 8 × 3/16" | 1500 | 30/3 | 425 | 76 | 4175 |
| KB 8510 | Face Die, 8 × 3/16" | 1500 | 30/3 | 400 | 70 | 3980 |
| KB 8511 | Face Die, 8 × 3/16" | 1500 | 27/3 | 450 | 79 | 4350 |

Table 10 outlines the levels of a RS4 wheat starch (Fibersym®) in wheat and rice flour base formulations.

| Trial | Cereal Base % | Colour Premix % | Conditioning Premix % | Starch RS4 % |
|---|---|---|---|---|
| KB 8540 | Wheat @ 83 | 6 | 11 | 0 |
| KB 8541 | Wheat @ 73 | 6 | 11 | 10 |
| KB 8510 | Rice @ 84 | 5 | 11 | 0 |
| KB 8511 | Rice @ 74 | 5 | 11 | 10 |

Table 11 outlines the range of components within the premixes of Table 10.

| Premix | % Sugars | % Salt | % Colours | % Conditioners | % Cereal carriers |
|---|---|---|---|---|---|
| Colour | 62-64 | 8-9 | 4-5 | 0 | 24-26 |
| Conditioning | 0 | 4-5 | 0 | 34-36 | 59-62 |

Sugars include: fructose and sucrose. Colours include; paprika and caramel. Conditioners include: oil, emulsifiers and nucleating agents. Cereal carriers include: wheat flour, rice flour and rice starch.

Table 12 summarizes the analytical data generated pertaining to the effect of RS4 wheat starch on influencing analytical characteristics of the crumb.

| Trial | DSC Tg ΔC$_p$ J/g · ° C. @ 44% Moisture | RVA Cooked Peak viscosity cP |
|---|---|---|
| KB 8540 | Not Analyzed | 2054 |
| KB 8541 | 0.062 | 1233 |
| KB 8510 | Not Analyzed | 1622 |
| KB 8511 | 0.225 | 992 |

As is evidenced by DSC and RVA analysis, both wheat and rice RS4 containing formulations, in accordance with aspect of the present invention, exhibited glass transitions and RS4 starch granule integrity supported by depressed cooked peak viscosities versus their non-RS4 controls (see FIG. 10).

KB 8541 and KB 8511, in accordance with aspect of the present invention, offered improved textural properties versus non-RS4 crumbs (KB 8540 and KB 8510) in a coated chicken nugget application subjected to storage abuse and microwave reheat. The wheat based KB 8541 provided a harder, crunchier texture versus the lighter crisp texture of the rice-based KB 8540. Formal sensory results against CMKD process control are presented in Example 6.

Example 4

This Example illustrates the use of RS4 resistant wheat starch, in combination with alternate starches, in texturizing crumbs made by HPST extrusion using a Wenger TX85 model as in Example 1.

TABLE 13

TX85 operating parameters used in evaluating the effect of RS4 wheat starch, in combination with high amylose corn and rice starch.

| Trial | Die Configuration | Dry Feed Rate kg/hr | Water wt % DDC/ Barrel | % Motor Load | Extruder RPM | Head Pressure kPa |
|---|---|---|---|---|---|---|
| W130417-010 | Back 24 × 0.171" × 2; 5/8" spacer; Front 2 × 0.25" | 612 | 31/0 | 78 | 500 | 3947 |
| W130418-020 | Back 24 × 0.171" × 2; 5/8" spacer; Front 2 × 0.25" | 584 | 33/0 | 69 | 500 | 4418 |
| W130418-021 | Back 24 × 0.171" × 2; 5/8" spacer; Front 2 × 0.25" | 614 | 31/0 | 76 | 500 | 4457 |
| W130418-018 | Back 24 × 0.171" × 2; 5/8" spacer; Front 2 × 0.25" | 591 | 32/0 | 71 | 500 | 4226 |
| W130418-019 | Back 24 × 0.171" × 2; 5/8" spacer; Front 2 × 0.25" | 584 | 33/0 | 67 | 500 | 4390 |

Table 14 outlines the levels of a RS4 wheat starch (Fibersym®) in combination with high amylose corn (Nylon VII®) and rice (Remy B7) starches in rice flour base formulations.

| Trial | Cereal Base % | Colour Premix % | Conditioning Premix % | Starch % RS4 | Hylon VII ® | Remy B7 |
|---|---|---|---|---|---|---|
| W130417-010 | Rice @ 80 | 6 | 4 | 10 | 0 | 0 |
| W130418-020 | Rice @ 80 | 6 | 4 | 5 | 5 | 0 |
| W130418-021 | Rice @ 80 | 6 | 4 | 5 | 0 | 5 |
| W130418-018 | Rice @ 80 | 6 | 4 | 0 | 10 | 0 |
| W130418-019 | Rice @ 80 | 6 | 4 | 0 | 0 | 10 |

Table 15 outlines the range of components within the premixes of Table 14.

| Premix | % Sugars | % Salt | % Colours | % Conditioners | % Cereal carriers |
|---|---|---|---|---|---|
| Colour | 69-71 | 16-18 | 4-5 | 0 | 6-8 |
| Conditioning | 0 | 0 | 0 | 33-35 | 63-65 |

Sugars include: fructose and sucrose. Colours include: paprika and caramel. Conditioners include: oil, emulsifiers and nucleating agents. Cereal carriers include: rice flour.

TABLE 16

SEM and RVA data pertaining to the effect of RS4 wheat starch, in combination with high amylose corn and rice starch, on analytical properties of the extruded crumb.

| Trial | 500X SEM Intact Starch | RVA Cooked Peak viscosity cP |
|---|---|---|
| W130417-010 | Evident | 1251 |
| W130418-020 | Not Analyzed | 1823 |
| W130418-021 | Not Analyzed | 1899 |
| W130418-018 | None | 2305 |
| W130418-019 | None | 2437 |

In this comparison, trials were run under similar conditions, focusing on the effect of alternate starches. These high amylose starches, with some resistance character, did not perform the same as the RS4 types under abuse conditions in coating crumb application. SEM analysis shows an amorphous matrix, but with no intact starch granules. The high amylose rice starch Remy B7 showed good textural and visual attributes on its own or in combination with RS4, but only under non-abused conditions. The RVA cooked peak viscosity analysis shows elevated peaks in the crumbs containing only added high amylose starch (see FIG. 11). This indicates greater swelling capacity and the subsequent moisture retention upon heating within these coating crumbs, affecting negatively their textural qualities.

Example 5

This Example illustrates the use of RS4 resistant wheat starch in texturizing crumbs within a CMKD process, the process as described in U.S. Pat. No. 4,423,078.

Table 17 outlines the levels of a RS4 wheat starch (Fibersym®) in these wheat flour base formulations.

| Trial | Cereal Base % | Conditioning Premix % | Starch RS4 % |
|---|---|---|---|
| KB 8880 A | Wheat @ 88 | 7 | 5 |
| KB 8880 B | Wheat @ 83 | 7 | 10 |
| KB 8804 | Wheat @ 93 | 7 | 0 |

Table 18 outlines the range of components within the premixes of Table 17.

| Premix | % Sugars | % Salt | % Conditioners |
|---|---|---|---|
| Conditioning | 14-16 | 14-16 | 69-71 |

Sugars include: dextrose. Conditioners include: oil, leavening, reducing and oxidizing agents.

Table 19 summarizes the analytical data generated pertaining to the effect of RS4 wheat starch on influencing analytical characteristics of the crumb.

| Trial | DSC Tg $\Delta C_p$ J/g · °C. @ 44% Moisture | 500X SEM Intact starch | RVA Cooked Peak Viscosity cP |
|---|---|---|---|
| KB 8880 A | Not Analyzed | Not Analyzed | 1664 |
| KB 8880 B | Negative | Not Analyzed | 1207 |
| KB 8804 | Negative | Evident | 3617 |

RS4 wheat resistant starch within the CMKD process does not exert the same effect on analytical results or performance characteristics as in the HPST extrusion process. Survival of intact native starch granules has the greatest influence and significantly masks any performance enhancement by the RS4 starch. No glass transition is observed with the RS4 addition. The RVA cooked peak viscosity (see FIG. 12) shows the elevated peak as produced by native starch (KB 8804) and its depression as affected by the dilution with RS4 in the CMKD process (KB 8880 A/B). Although the depressed peak is characteristic of HPST extruded crumbs made with RS4 in accordance with the present invention, the lack of any cold viscosity in the CMKD processed crumbs with RS4 indicates native starch granules are still intact, embedded in the dough matrix, available to swell and retain moisture during the cook cycle of the coated product.

CMKD processed crumbs with RS4 show no significant improvement in crispiness, fracturability or persistence in a stressed coating application on chicken nuggets compared to the KB 8804 control without RS4 and negligible texture when compared to HPST extruded RS4 containing crumbs of the present invention. Additional textural comments focused on an increased chalkiness character in CMKD processed crumbs containing RS4.

Example 6

This Example describes the finished product textural performance of HPST extruded crumbs containing RS4 resistant wheat starch, in accordance with the present invention, against control crumbs manufactured in a CMKD process.

The crumbs were applied in a coating sequence to chicken nuggets using a multi lamination pilot process. Both par-fry/freeze and par-fry/cook/freeze processing scenarios were investigated to expand versatility for reheat from frozen; oven or microwave. The reheated nuggets were evaluated by a panel of professional tasters. Both stressed and non-stressed reheated nuggets were evaluated for their textural qualities. The stressed versions had undergone freeze-thaw conditions of either a 6-cycle freeze/thaw for 4 hours at 4° C. and subsequent re-freeze to −25° C., or one cycle of 24 hours at 4° C. with subsequent re-freeze to −25° C. Further comparisons were also made against products held under continuous frozen storage with no further abuse.

FIGS. 13 to 16 compare the textural performance in a commercial retail (oven cooked) application of fully expanded crumbs produced from formulations containing RS4 resistant wheat starch with wheat (W120525-022, 10% RS4), corn (W120525-028, 15% RS4) or rice (W120525-029, 15% RS4) flour bases, in accordance with the present invention, against those produced in a CMKD process with wheat flour (KB 8804). Control nuggets for each sample were not stressed, while stressed nugget samples underwent 6 freeze/thaw cycles. Crumbs of the present invention with wheat resistant starch generally maintained or improved in crispiness and persistence with reduced cohesiveness after freeze/thaw abuse while KB 8804 decreased in crispiness and persistence. Amongst crumb samples with RS4 resistant wheat starch, the rice based crumb had the best overall texture after freeze/thaw abuse, followed by wheat and corn.

Tables 20 and 21 summarize the results of formal texture analysis of chicken nuggets with HPST extruded commercial scale produced KB 8541 (10% RS4), in accordance with the present invention, and CMKD processed KB 8804 after a 30 minute hold post cooking and 6 freeze/thaw cycles. Results were scored on a 9-point hedonic liking scale for several textural attributes.

TABLE 20

Chicken Nugget Texture: Oven Reheat with 30 Minute Warming Cabinet Hold

| Attribute | KB 8804 | KB 8541 |
|---|---|---|
| Overall | 5.1 | 6.3 |
| Crispiness | 5.1 | 6.4 |
| Cohesiveness | 5.3 | 5.7 |
| Persistence | 6.6 | 5.1 |

TABLE 21

Chicken Nugget Texture: Oven Reheat after Freeze/Thaw Cycling

| Attribute | KB 8804 | KB 8541 |
|---|---|---|
| Overall | 4.2 | 5.5 |
| Crispiness | 4.9 | 6.2 |
| Cohesiveness | 4.9 | 5.4 |
| Persistence | 5.0 | 5.4 |

KB 8541, in accordance with the present invention, was significantly preferred for overall texture and for crispiness in both the 30 minute held and freeze/thaw abused scenarios. Panelists described the KB 8541 as crispy and glassy with slight cohesion, while KB 8804 comments described it as denser, less crispy and more cohesive.

FIG. 17 and Table 22 summarizes sensory results comparing textural attributes of chicken nuggets in a commercial retail application after freeze/thaw abuse and microwave oven reheat.

TABLE 22

Chicken Nugget Texture: Microwave Reheat after Freeze/Thaw Cycling

| Attribute | KB 8804 | KB 8511 (Rice, 10% RS4) | KB 8541 (Wheat, 10% RS4) |
|---|---|---|---|
| Crispiness | 2.0 | 3.2 | 4.8 |
| Cohesiveness | 5.3 | 4.6 | 4.9 |
| Denseness | 5.1 | 5.0 | 5.7 |
| Persistence | 3.9 | 5.6 | 7.8 |
| Interface | 5.0 | 4.4 | 4.4 |

Commercial scale HPST extruded RS4 resistant wheat starch containing crumbs KB 8541 (wheat base, 10% RS4) and KB 8511 (rice base, 10% RS4), in accordance with the present invention, were compared against CMKD processed KB 8804 as a control. Both KB 8541 and KB 8511 had significantly better crispiness and persistence versus the control. The wheat based KB 8541 was preferred overall for texture. Additional texture panelist comments identified KB 8541 as the driest coating with crispy/crunch character, KB 8511 with a lighter crisp, and the control KB 8804 as soft, wet and more cohesive.

Although certain embodiments have been described with reference to the figures, those of skill in the art will appreciate that variations and modifications may be made without departing from the scope thereof as defined by the appended claims. As such, the scope of the appended claims should not be limited by the preferred embodiments set forth in the examples, but should be given the broadest interpretation consistent with the description as a whole.

The invention claimed is:

1. A textured crumb product, formed by high pressure short time (HPST) extrusion, from a composition comprising RS4 resistant starch, wherein one or more of the following:
   the composition further comprises about 29 wt % to about 37 wt % water based on the total dry component feed into the extruder,
   using differential scanning calorimetry, the textured crumb product exhibits a glass transition temperature from about 50 to about 60° C. at a moisture level of about 44%,
   when examined under scanning electron microscopy with about 500 to about 1000 magnification, the textured crumb product shows a predominantly gelled and amorphous matrix with intact resistant starch granules sitting on the matrix, and
   using rapid visco-analysis (RVA), the textured crumb product exhibits a depressed cook peak viscosity of up to about 50% relative to a textured crumb product formed by HPST extrusion from a composition not comprising RS4 resistant starch.

2. The textured crumb product of claim 1, wherein the RS4 resistant starch is present in amount selected from the group consisting of up to about 20 wt %, up to about 5 wt %, from about 5 wt % to about 20 wt %, from about 5 wt % to about 15 wt %, from about 5 wt % to about 10 wt %, from about 10 wt % to about 15 wt %, from about 15 wt % to about 20 wt %, about 5 wt %, about 10 wt %, about 15 wt % and about 20 wt %, of the composition.

3. The textured crumb product of claim 1 further comprising a cereal base.

4. The textured crumb product of claim 3, wherein the cereal base is present in an amount from about 65 to about 95 wt % of the composition.

5. The textured crumb product of claim 3, wherein the cereal base is wheat, rice or corn.

6. The textured crumb product of claim 1 further comprising a colour pre-mix comprising a colour.

7. The textured crumb product of claim 6, wherein the colour pre-mix is present in an amount from about 1 to about 10 wt % of the composition.

8. The textured crumb product of claim 6, wherein the colour pre-mix further comprises an ingredient selected from the group consisting of a sugar, a salt, a cereal carrier and combinations thereof.

9. The textured crumb product of claim 1 further comprising a conditioning pre-mix comprising a conditioner.

10. The textured crumb product of claim 9, wherein the conditioning pre-mix is present in an amount of from about 4 to about 12 wt % of the composition.

11. The textured crumb product of claim 9, wherein the conditioning pre-mix further comprises an ingredient selected from the group consisting of a sugar, a salt, a cereal carrier and combinations thereof.

12. A food product coated with the textured crumb product according to claim 1.

13. A method of forming a textured crumb product, the method comprising extruding a composition comprising RS4 resistant starch using high pressure short time (HPST) extrusion to form the textured crumb product, wherein one or more of the following:
   the composition further comprises about 29 wt % to about 37 wt % water based on the total dry component feed into the extruder,
   using differential scanning calorimetry, the textured crumb product exhibits a glass transition temperature from about 50 to about 60° C. at a moisture level of about 44%,
   when examined under scanning electron microscopy with about 500 to about 1000 magnification, the textured crumb product shows a predominantly gelled and amorphous matrix with intact resistant starch granules sitting on the matrix, and
   using rapid visco-analysis (RVA), the textured crumb product exhibits a depressed cook peak viscosity of up to about 50% relative to a textured crumb product formed by HPST extrusion from a composition not comprising RS4 resistant starch.

14. A use of RS4 resistant starch and high pressure short time (HPST) extrusion, in the preparation of a textured crumb product, wherein a composition comprising the RS4 resistant starch is extruded using HPST to form the textured crumb product, wherein one or more of the following:
   the composition further comprises about 29 wt % to about 37 wt % water based on the total dry component feed into the extruder,
   using differential scanning calorimetry, the textured crumb product exhibits a glass transition temperature from about 50 to about 60° C. at a moisture level of about 44%,
   when examined under scanning electron microscopy with about 500 to about 1000 magnification, the textured crumb product shows a predominantly gelled and amorphous matrix with intact resistant starch granules sitting on the matrix, and
   using rapid visco-analysis (RVA), the textured crumb product exhibits a depressed cook peak viscosity of up to about 50% relative to a textured crumb product formed by HPST extrusion from a composition not comprising RS4 resistant starch.

15. The textured crumb product of claim 6, wherein the colour is selected from the group consisting of paprika, caramel, annatto and turmeric.

16. The textured crumb product of claim 8, wherein the cereal carrier is selected from the group consisting of wheat flour, rice flour, corn starch, corn flour and rice starch.

17. The textured crumb product of claim 11, wherein the cereal carrier is selected from the group consisting of wheat flour, rice flour, corn starch, corn flour and rice starch.

18. The textured crumb product of claim 9, wherein the conditioner is selected from the group consisting of an oil, an emulsifier, a nucleating agent, a leavening agent, a reducing agent and an oxidizing agent.

19. A use of the textured crumb product of claim 1 in coating a food product, wherein the food product is coated with the textured crumb product.

20. The textured crumb product of claim 6, wherein the colour is present in an amount of up to about 1 wt % of the composition.

21. The textured crumb product of claim 8, wherein the sugar is present in an amount of up to about 5 wt % of the composition.

22. The textured crumb product of claim 8, wherein the sugar is selected from the group consisting of dextrose, fructose, sucrose and combinations thereof.

23. The textured crumb product of claim 8, wherein the salt is present in an amount of up to about 2 wt % of the composition.

24. The textured crumb product of claim 8, wherein the cereal carrier is present in an amount of from about 6 wt % to about 45 wt % of the colour pre-mix.

25. The textured crumb product of claim 9, wherein the conditioner is present in an amount of up to about 10 wt % of the composition.

26. The textured crumb product of claim 11, wherein the sugar is present in an amount of up to about 5 wt % of the composition.

27. The textured crumb product of claim 11, wherein the sugar is selected from the group consisting of dextrose, fructose, sucrose and combinations thereof.

28. The textured crumb product of claim 11, wherein the salt is present in an amount of up to about 2 wt % of the composition.

29. The textured crumb product of claim 11, wherein the cereal carrier is present in an amount of from about 34 wt % to about 72 wt % of the conditioning pre-mix.

\* \* \* \* \*